T. H. CONNORS.
ROAD MAP HOLDER.
APPLICATION FILED MAR. 28, 1912.
1,065,295.
Patented June 17, 1913.
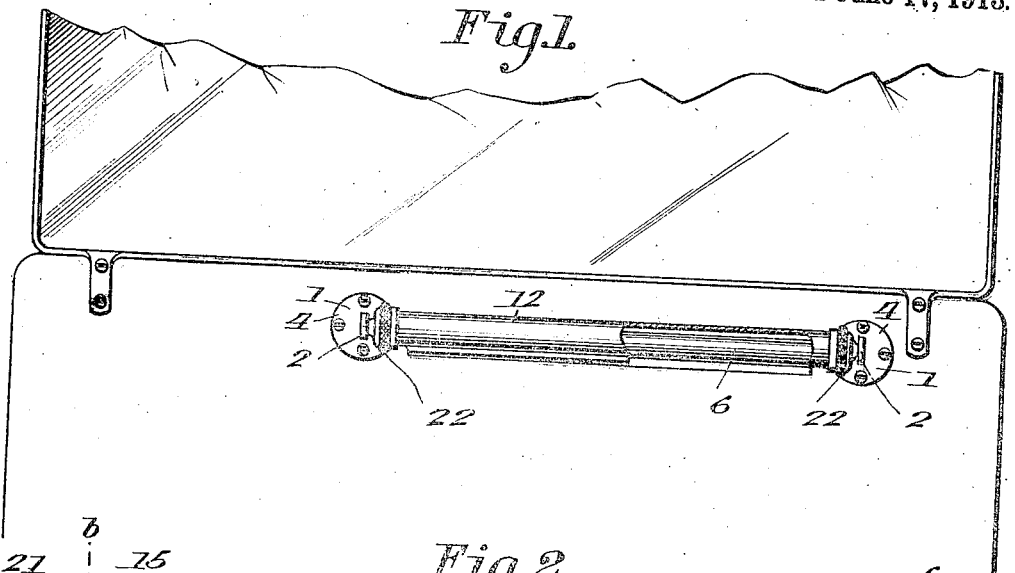
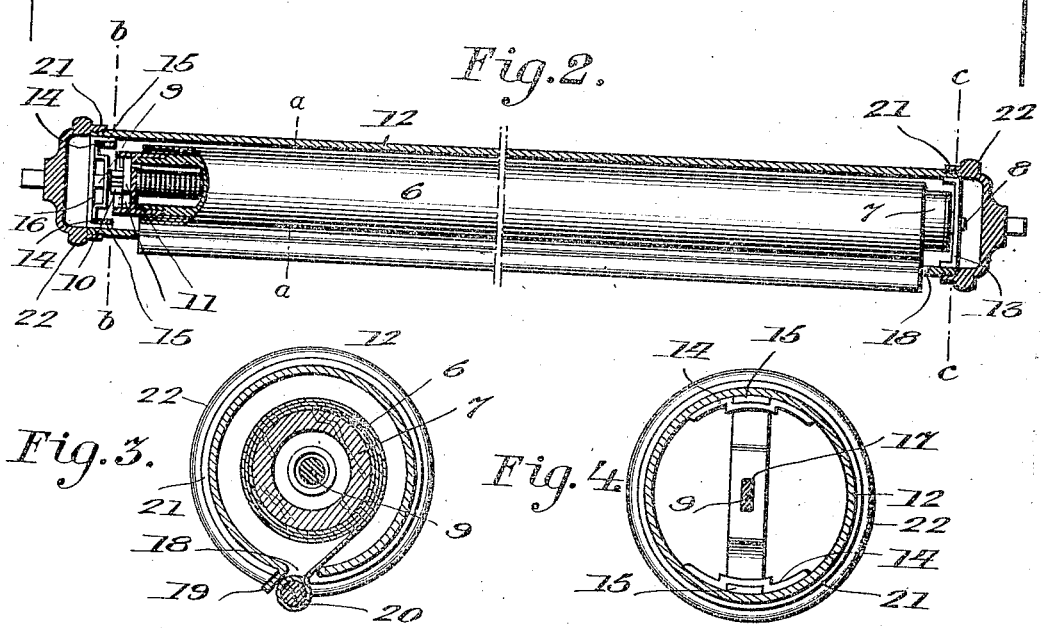
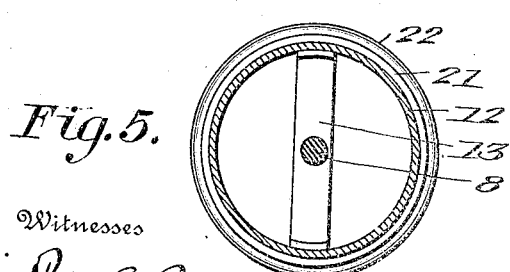
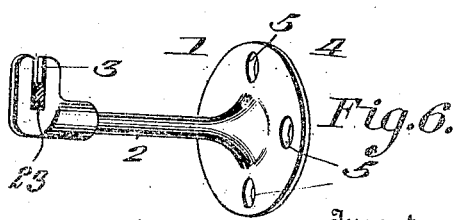
Witnesses
Philip E. Barnes
J. W. Garner
Inventor
Thomas H. Connors
By Victor J. Evans
Attorney

UNITED STATES PATENT OFFICE.

THOMAS H. CONNORS, OF SEAFORTH, MINNESOTA.

ROAD-MAP HOLDER.

1,065,295.  Specification of Letters Patent.  Patented June 17, 1913.

Application filed March 28, 1912. Serial No. 686,816.

*To all whom it may concern:*

Be it known that I, THOMAS H. CONNORS, a citizen of the United States, residing at Seaforth, in the county of Redwood and State of Minnesota, have invented new and useful Improvements in Road-Map Holders, of which the following is a specification.

This invention is an improved road map holder, especially adapted for holding a road map in an automobile or other vehicle, the object of the invention being to provide an improved device of this character which is simple, cheap, compact, strong and durable and which is adapted to be readily attached to a dash board or any other convenient portion of an automobile, the invention consisting in the construction, combination and arrangement of devices hereinafter described and claimed.

In the accompanying drawing:—Figure 1 is partly an elevation and partly a vertical longitudinal sectional view of a road map holder constructed in accordance with my invention, showing the same mounted on the dash board of an automobile. Fig. 2 is a vertical longitudinal sectional view of the same. Fig. 3 is a vertical central transverse view of the same on the plane indicated by the line $a$—$a$ of Fig. 2. Fig. 4 is a vertical sectional view of the same on the plane indicated by the line $b$—$b$ of Fig. 2. Fig. 5 is a similar view on the plane indicated by the line $c$—$c$ of Fig. 2. Fig. 6 is a detail perspective view of one of the supporting brackets, the spindle of one of the caps being shown in transverse section.

In accordance with my invention, I provide a pair of brackets 1 each of which has an upturned arm 2 at its outer end provided in its upper side with a vertical bearing 3. Each bracket has a base 4 at its inner end which is adapted to bear against the inner side of an automobile dash board, or against any other convenient portion of an automobile, and to be secured thereto as by means of screws which are inserted through openings 5 in the base.

The map 6 is flexible and is mounted on a spring roller 7 of usual form, such, for instance, as is employed for a window shade, the said spring roller being provided at one end with a spindle 8 and at the other end with a spring revoluble spindle 9 which spindle is provided with the usual notched disk 10, the notches being engaged by the usual gravity dogs 11.

The spring roller is arranged for revolution in a tubular casing 12, the said casing being provided at one end with a fixed cross bar 13 which has a bearing opening for the reception of the spindle 8. In the opposite end of the tubular casing are oppositely disposed keepers 14 which receive the ends of arms 15 of a detachable substantially U-shaped yoke bar 16, which is provided at its center with an angular opening 17 to receive the cross sectionally angular spindle 9 of the spring roller. In one side of the tubular casing is a longitudinal opening 18 and the said tubular casing has a radial lip 19 outturned therefrom and arranged at one side of the said opening. The map extends through the said opening and is provided at its outer or free end with a suitable stick or stiffening bar 20 which may be readily grasped and drawn downwardly when it is desired to unroll the map to enable the same to be inspected, it being understood that the spring roller on which the map is mounted serves to roll up the map when the same is not in use and dispose it compactly and safely in the tubular casing 12 where it is entirely protected from the weather.

The ends of the tubular casing are provided with external screw threads which are engaged by the threaded inner sides of the flanges 21 of a pair of detachable caps 22 which form closures for the ends of the tubular casing. These caps are provided with centrally arranged outwardly projecting spindles 23 which may be detachably mounted in the bearing slots 3 of the brackets 1.

While I have herein shown and described a preferred form of my invention, I would have it understood that changes may be made in the form, proportion and construction of the several parts without departing from the spirit of my invention and within the scope of the appended claim.

I claim:—

A map holder of the class described comprising a tubular casing having a longitudinal opening in one side through which a map may extend, the said casing being provided at one end with a fixed bearing bar and at the opposite end with keepers, a removable bearing bar mounted in the keepers, and a map roller arranged in the casing and having spindles at its ends for engagement with the said fixed and removable bearing bars.

In testimony whereof I affix my signature in presence of two witnesses.

THOMAS H. CONNORS.

Witnesses:
 Jos. Gistulka,
 F. E. Sylvester.